United States Patent
Taruya et al.

(10) Patent No.: US 10,115,989 B2
(45) Date of Patent: Oct. 30, 2018

(54) OPERATION METHOD OF FUEL CELL SYSTEM AND FUEL CELL SYSTEM

(71) Applicant: HONDA MOTOR CO., LTD., Tokyo (JP)

(72) Inventors: Kenji Taruya, Wako (JP); Yuji Matsumoto, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 416 days.

(21) Appl. No.: 14/744,036

(22) Filed: Jun. 19, 2015

(65) Prior Publication Data

US 2015/0372328 A1    Dec. 24, 2015

(30) Foreign Application Priority Data

Jun. 20, 2014 (JP) ................. 2014-127501

(51) Int. Cl.
*H01M 8/04* (2016.01)
*H01M 8/04537* (2016.01)
(Continued)

(52) U.S. Cl.
CPC .... *H01M 8/04626* (2013.01); *H01M 8/04111* (2013.01); *H01M 8/04492* (2013.01); *H01M 8/04753* (2013.01); *H02J 1/00* (2013.01); *H01M 8/04097* (2013.01); *H01M 8/04141* (2013.01); *H01M 2250/20* (2013.01); *H02J 2001/004* (2013.01); *Y02T 90/32* (2013.01)

(58) Field of Classification Search
None
See application file for complete search history.

(56) References Cited

U.S. PATENT DOCUMENTS

| | | | |
|---|---|---|---|
| 2010/0055522 A1* | 3/2010 | Manabe | B60L 1/003 429/431 |
| 2014/0248551 A1* | 9/2014 | Kumada | B60L 1/003 429/446 |
| 2015/0349358 A1* | 12/2015 | Takeda | H01M 8/04828 429/446 |

FOREIGN PATENT DOCUMENTS

| | | |
|---|---|---|
| JP | 06-111840 | 4/1994 |
| JP | 2004-172027 | 6/2004 |

(Continued)

OTHER PUBLICATIONS

Japanese Office Action for corresponding JP Application No. 2014-127501, dated Oct. 25, 2016 (w/ English machine translation).

*Primary Examiner* — Sarah A. Slifka
*Assistant Examiner* — Haroon S. Sheikh
(74) *Attorney, Agent, or Firm* — Mori & Ward, LLP (57) ABSTRACT

An operation method of a fuel cell system includes providing a turbo pump to supply an oxidant gas to a fuel cell to generate power through a reaction between a fuel gas and the oxidant gas. A branch valve to regulate a flow rate of the oxidant gas which flows through a branch passage that connects an oxidant gas supply passage and an oxidant off-gas discharge passage is provided. The turbo pump and the branch valve are controlled to regulate a flow rate of the oxidant gas to be supplied to the fuel cell in an extremely low power generation mode in which an extremely low generation power is requested. The extremely low generation power is less than or equal to a predetermined generation power corresponding to a minimum flow rate of the oxidant gas that is supplied by the turbo pump.

17 Claims, 6 Drawing Sheets (51) Int. Cl.
*H01M 8/04111* (2016.01)
*H01M 8/04746* (2016.01)
*H01M 8/04492* (2016.01)
*H02J 1/00* (2006.01)
*H01M 8/04089* (2016.01)
*H01M 8/04119* (2016.01)

(56) References Cited

FOREIGN PATENT DOCUMENTS

JP  2009-123550  6/2009
JP  2010-146750  7/2010

\* cited by examiner

OPERATION METHOD OF FUEL CELL SYSTEM AND FUEL CELL SYSTEM

CROSS-REFERENCE TO RELATED APPLICATIONS

The present application claims priority under 35 U.S.C. §119 to Japanese Patent Application No. 2014-127501, filed Jun. 20, 2014, entitled "Operation Method of Fuel Cell System." The contents of this application are incorporated herein by reference in their entirety.

BACKGROUND

1. Field

The present disclosure relates to an operation method of a fuel cell system and a fuel cell system.

2. Description of the Related Art

In a fuel cell, hydrogen is supplied as fuel gas to an anode and air is supplied as oxidant gas to a cathode, hydrogen ions generated at the anode by a catalytic reaction move through an electrolyte membrane to the cathode, and have an electrochemical reaction with oxygen in the air to generate electricity at the cathode.

A fuel cell system includes an anode-side passage through which fuel gas is circulated in the fuel cell, and a cathode-side passage through which oxidant gas is circulated in the fuel cell. The cathode-side passage may be provided with a bypass passage (branch passage) that dilutes hydrogen of oxidant off-gas and controls the pressure in the cathode-side passage (see, for instance, Japanese Unexamined Patent Application Publication No. 2004-172027 and Japanese Unexamined Patent Application Publication No. 6-111840).

It is known that when the electrolyte membrane of a fuel cell is in an excessively dried state (hereinafter referred to as "dry-up state"), the power generation performance of the fuel cell is reduced, and eventually resulting in deterioration of the electrolyte membrane. Therefore, in the fuel cell system, dry-up state is avoided by appropriately controlling a flow rate of the oxidant gas that flows within the cathode-side passage, according to the power generation amount of the fuel cell.

In addition, the fuel cell system is provided with a pump for circulating the oxidant gas through the cathode-side passage. Various types of pump are adopted as the pump, such as what is called a Lysholm pump and a turbo pump. In the case of a Lysholm pump, it is possible to easily control a flow rate of the oxidant gas that flows within the cathode-side passage, according to the power generation amount of the fuel cell.

SUMMARY

According to one aspect of the present invention, an operation method of a fuel cell system includes controlling a turbo pump and a branch valve, thereby regulating a flow rate of an oxidant gas to be supplied to a fuel cell by a control unit in an extremely low power generation mode in which an extremely low generation power is requested. The extremely low generation power is less than or equal to a predetermined generation power corresponding to a minimum flow rate of the oxidant gas that may be supplied by the turbo pump. The fuel cell system includes the fuel cell, the turbo pump, an oxidant gas supply passage, an oxidant off-gas discharge passage, a branch passage, the branch valve and the control unit. The fuel cell generates power due to a reaction between a fuel gas and the oxidant gas. The turbo pump supplies the oxidant gas to the fuel cell. The oxidant gas supplied to the fuel cell by the turbo pump flows through the oxidant gas supply passage. An oxidant off-gas discharged from the fuel cell flows through the oxidant off-gas discharge passage. The branch passage connects the oxidant gas supply passage and the oxidant off-gas discharge passage. The branch valve allows a flow rate of the oxidant gas to be regulated. The oxidant gas flows through the branch passage. The control unit controls generation power of the fuel cell.

According to another aspect of the present invention, an operation method of a fuel cell system includes providing a turbo pump to supply an oxidant gas to a fuel cell to generate power through a reaction between a fuel gas and the oxidant gas. A branch valve to regulate a flow rate of the oxidant gas which flows through a branch passage that connects an oxidant gas supply passage and an oxidant off-gas discharge passage is provided. The oxidant gas supplied to the fuel cell by the turbo pump flows through the oxidant gas supply passage. An oxidant off-gas discharged from the fuel cell flows through the oxidant off-gas discharge passage. The turbo pump and the branch valve are controlled to regulate a flow rate of the oxidant gas to be supplied to the fuel cell in an extremely low power generation mode in which an extremely low generation power is requested. The extremely low generation power is less than or equal to a predetermined generation power corresponding to a minimum flow rate of the oxidant gas that is supplied by the turbo pump.

According to further aspect of the present invention, a fuel cell system includes a fuel cell, a turbo pump, an oxidant gas supply passage, an oxidant off-gas discharge passage, a branch passage, a branch valve, and a controller. The fuel cell is to generate power through a reaction between a fuel gas and an oxidant gas. The turbo pump is to supply the oxidant gas to the fuel cell. The oxidant gas is supplied to the fuel cell by the turbo pump through the oxidant gas supply passage. An oxidant off-gas is discharged from the fuel cell through the oxidant off-gas discharge passage. The branch passage connects the oxidant gas supply passage and the oxidant off-gas discharge passage. The branch valve is to regulate a flow rate of the oxidant gas flowing through the branch passage. The controller is to control the turbo pump and the branch valve to regulate a flow rate of the oxidant gas to be supplied to the fuel cell in an extremely low power generation mode in which an extremely low generation power is requested. The extremely low generation power is less than or equal to a predetermined generation power corresponding to a minimum flow rate of the oxidant gas that is supplied by the turbo pump.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, a control method of a fuel cell system according to a first embodiment of the present disclosure will be described. Hereinafter, the schematic configuration of the fuel cell system will be first described, then an operation method of the fuel cell system will be described.

Figure 1:
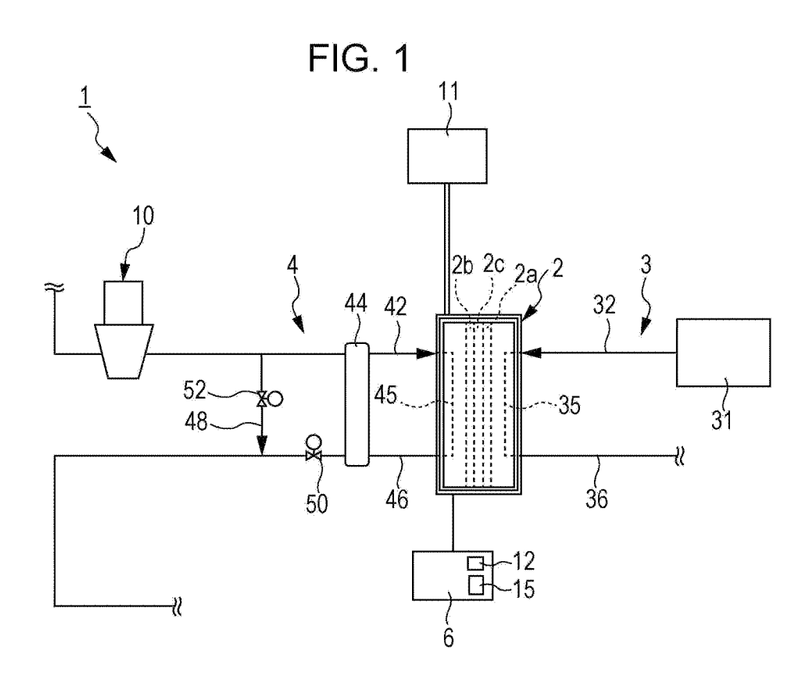
FIG. 1 is a schematic configuration diagram of a fuel cell system according to a first embodiment of the present disclosure.

FIG. 1 is a schematic configuration diagram of a fuel cell system 1.

As illustrated in FIG. 1, the fuel cell system 1 of the first embodiment is mounted on, for instance, a fuel cell vehicle (not illustrated), and mainly includes a fuel cell 2, a turbo pump 10, an anode-side passage 3 for supplying hydrogen which is fuel gas to an anode 2a of the fuel cell 2, a cathode-side passage 4 for supplying air which is oxidant gas to a cathode 2b of the fuel cell 2, a high voltage battery 11 (which corresponds to the "power storage unit" in the appended claims) in which power generated in the fuel cell 2 is charged (stored), and a control device 6 (which corresponds to the "control unit" in the appended claims) that controls these components comprehensively.

The fuel cell 2 is formed of plural cells that are stacked. The cell is formed by interposing a solid polymer electrolyte membrane (hereinafter simply referred to as "electrolyte membrane") 2c which is, for instance, a solid polymer ion exchange membrane, between the anode 2a and the cathode 2b. Note that only one cell is illustrated in FIG. 1 for convenience of illustration. In the fuel cell 2, hydrogen is supplied as fuel gas to the anode 2a and air containing oxygen is supplied as oxidant gas to the cathode 2b. Accordingly, hydrogen ions generated in the anode 2a move through the electrolyte membrane 2c to the cathode 2b, and have an electrochemical reaction with oxygen to generate electricity at the cathode 2b.

The fuel cell 2 is connected to the high voltage battery 11 via a conductor or a voltage control unit (VCU) which are not illustrated. The high voltage battery 11 is capable of charging (storing) the power that is generated in the fuel cell 2. The fuel cell 2 and the high voltage battery 11 are electrically connected to an electric motor of the fuel cell vehicle and an external load (not illustrated) such as auxiliary equipment to allow power consumption.

The anode-side passage 3 has a fuel gas supply passage 32 through which fuel gas supplied to the anode 2a flows, and a fuel off-gas discharge passage 36 through which fuel off-gas discharged from the anode 2a flows. The fuel gas supply passage 32 is connected to a hydrogen supply tank 31.

The fuel gas supply passage 32 is connected to a cut-off valve, an injector, and/or an ejector which are not illustrated.

The fuel gas supply passage 32 is connected to an inlet of a fuel gas passage 35 that faces the anode 2a in the fuel cell 2.

The fuel off-gas discharge passage 36 is connected to an outlet of the fuel gas passage 35. The fuel off-gas discharge passage 36 allows off-gas of fuel and water to pass therethrough, the fuel being used for power generation in the fuel cell 2, the water being produced in the fuel cell 2 (hereinafter referred to as "produced water") by power generation and condensation. The fuel off-gas discharge passage 36 is provided with a catch tank which is not illustrated. The catch tank catches the liquid water that flows through the fuel off-gas discharge passage 36.

The cathode-side passage 4 is formed of an oxidant gas supply passage 42 through which oxidant gas supplied to the cathode 2b flows, an oxidant off-gas discharge passage 46 through which oxidant off-gas discharged from the cathode 2b flows, and a branch passage 48 that connects the oxidant gas supply passage 42 and the oxidant off-gas discharge passage 46.

An intake manifold (not illustrated) and the below-described turbo pump 10 are provided in that order from the upstream side to the downstream side in the flow direction of the oxidant gas in the oxidant gas supply passage 42. The oxidant gas supply passage 42 is connected to an inlet of an oxidant gas passage 45 that faces the cathode 2b in the fuel cell 2.

The oxidant gas supply passage 42 is provided with a humidifier 44 that is located downstream in the flow direction of the oxidant gas from the turbo pump 10. The humidifier 44 includes a water permeable membrane such as a hollow fiber membrane, and uses moistened off-gas of oxidant gas as humidification gas to humidify the oxidant gas sent out from the turbo pump 10, the oxidant gas being provided for power generation in the fuel cell 2.

The oxidant off-gas discharge passage 46 is connected to an outlet of the oxidant gas passage 45. The oxidant off-gas discharge passage 46 allows off-gas of the oxidant gas provided for power generation in the fuel cell 2 and produced water to flow. The oxidant off-gas discharge passage 46 is provided with a pressure regulating valve 50.

The pressure regulating valve 50 is provided between the humidifier 44 and the branch passage 48 described below. The pressure regulating valve 50 controls the quantity of cathode off-gas that flows through the oxidant off-gas discharge passage 46 and regulates the internal pressure of the fuel cell 2 by the control of the control device 6. The pressure regulating valve 50 in the present embodiment is controlled to desired opening by the control device 6.

The branch passage 48 connects the oxidant gas supply passage 42 and the oxidant off-gas discharge passage 46. The branch passage 48 branches off from a point downstream of the turbo pump 10 in the oxidant gas supply passage 42, and is connected to a point downstream of the pressure regulating valve 50 in the oxidant off-gas discharge passage 46.

The branch passage 48 is provided with a branch valve 52. The branch valve 52 regulates the flow rate of cathode off-gas that flows through the branch passage 48, by the control of the control device 6. The branch valve 52 in the present embodiment is controlled by the control device 6 to one of fully closed state and fully open state.

The turbo pump 10 rotates a blade within a casing, thereby sending air which is oxidant gas for supplying to the fuel cell 2.

The turbo pump 10 is what is called non-positive displacement pump. The turbo pump 10 is superior in silence performance in rotation and cost compared with a positive displacement pump such as a Lysholm pump, for instance.

Figure 2:
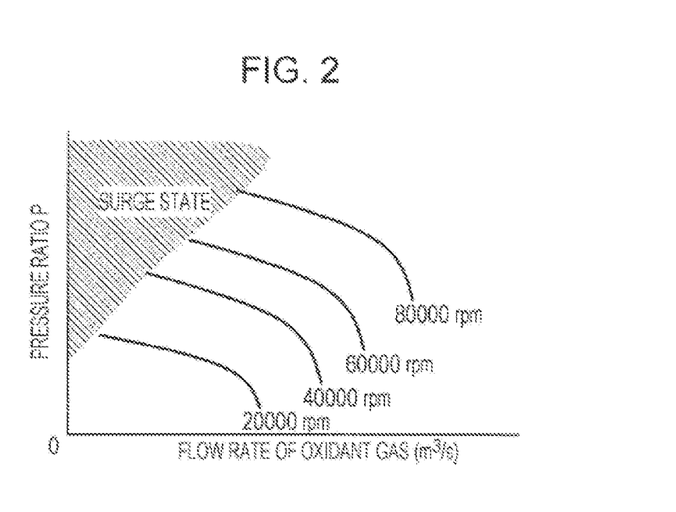
FIG. 2 is a graph illustrating a characteristic of a turbo pump.

FIG. 2 is a graph illustrating the characteristic of the turbo pump 10 for each of given rotational speeds where the horizontal axis indicates the flow rate of oxidant gas (m³/s) and the vertical axis indicates pressure ratio P of the turbo pump 10. Note that the pressure ratio P is calculated by P=Po/Pi where Pi is the pressure of oxidant gas at the inlet of the turbo pump 10 and Po is the pressure of oxidant gas at the outlet of the turbo pump 10.

As illustrated in FIG. 2, the turbo expression pump 10 is used at a rotational speed of from about 20,000 to 80,000 rpm, for instance. The turbo pump 10 has the characteristic that when the pressure Po at the outlet of the turbo pump 1 is increased to reduce the flow rate, the turbo pump 10 assumes a surge state. Here, a surge state indicates a state where intense pressure change and noise occur and stable operation is not possible in a region having a low amount of flow. The turbo pump 10 is driven at a rotational speed higher than or equal to a predetermined rotational speed (for instance, 20,000 rpm) to avoid a surge state. That is, the turbo pump 10 has the characteristic that a minimum rotational speed is restricted to the predetermined value.

The control device 6 controls starting and stopping of the fuel cell system 1 based on an ON/OFF signal inputted from an ignition switch (not illustrated). In addition, the control device 6 controls the turbo pump 10 and the pressure regulating valve 50, the branch valve 52, an injector, an ejector (not illustrated) according to the detail of control such as output control of the fuel cell 2.

The control device 6 is internally provided with a battery capacity detection unit 12 (which corresponds to the "stored power amount detection unit" in the appended claims). The battery capacity detection unit 12 is electrically connected to a voltage sensor and/or a current sensor (both not illustrated) provided in the vicinity of the high voltage battery 11. The battery capacity detection unit 12 calculates the amount of charge and discharge of the high voltage battery 11 based on measured values from the voltage sensor and/or the current sensor, and detects the capacity (state of charge (SOC)) of the high voltage battery 11.

In addition, the control device 6 is internally provided with a dry state detection unit 15 (which corresponds to the "dry state detection unit" in the appended claims). The dry state detection unit 15 is connected to the fuel cell 2, and detects whether or not an electrolyte membrane 2c of the fuel cell 2 is in a dry state (hereinafter referred to as "dry-up state"). The dry state detection unit 15 causes an AC current with a predetermined value to pass through the electrolyte membrane 2c, for instance, and based on voltage behavior at the moment, calculates an impedance of the electrolyte membrane 2c. The control device 6 determines whether or not the fuel cell 2 is in dry-up state based on the magnitude of the impedance of the electrolyte membrane 2c calculated by the dry state detection unit 15.

(Operation Method of Fuel Cell System)

Figure 3:
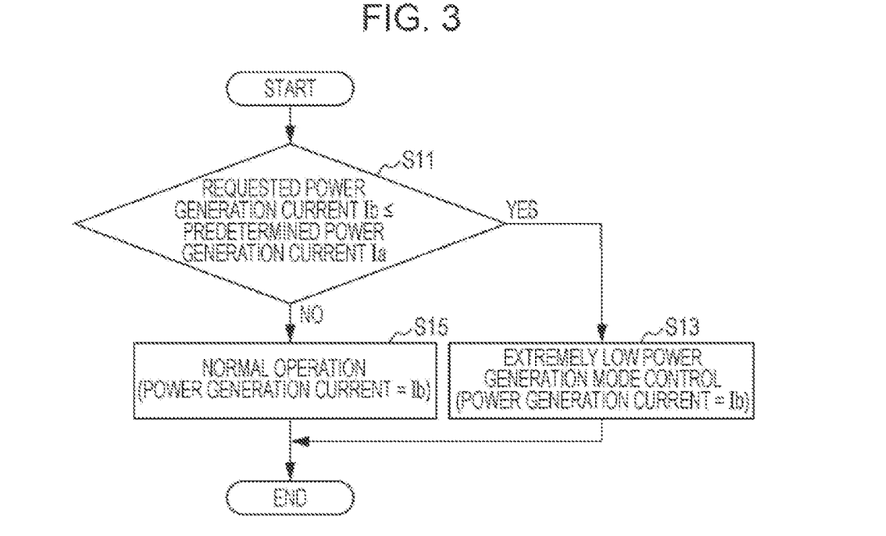
FIG. 3 is a flow chart of an operation method of the fuel cell system according to the first embodiment.

FIG. 3 is a flow chart of an operation method of the fuel cell system 1 according to the first embodiment.

Next, the operation method of the fuel cell system 1 configured as described above will be explained. See FIG. 1 for the symbol of each component in the following description.

In the operation method of the fuel cell system 1 in the present embodiment, the turbo pump 10, the pressure regulating valve 50, and the branch valve 52 are controlled so that the amount of flow of the oxidant gas supplied to the fuel cell 2 is regulated in an extremely low power generation mode in which extremely low power generation current (which corresponds to the "extremely low generation power" in the appended claims) is requested, the extremely low power generation current being less than or equal to a predetermined power generation current Ia (which corresponds to the "predetermined generation power" in the appended claims) corresponding to a minimum flow rate of oxidant gas (hereinafter referred to as the "minimum flow rate Qs of oxidant gas") that may be supplied at the time of a minimum rotational speed of the turbo pump 10.

As illustrated in FIG. 3, in the operation method of the fuel cell system 1, requested power generation current determination step S11 is performed first. In the requested power generation current determination step S11, it is determined whether or not a power generation current Ib requested to the fuel cell system 1 (hereinafter referred to as "requested power generation current Ib") is less than or equal to a predetermined power generation current Ia.

When determination of "YES" is made in the requested power generation current determination step S11, extremely low power generation mode control S13 is performed.

In extremely low power generation mode control S13, the control device 6 controls the turbo pump 10, the branch valve 52, and the pressure regulating valve 50, thereby regulating the flow rate of oxidant gas supplied to the fuel cell 2.

Figure 4:
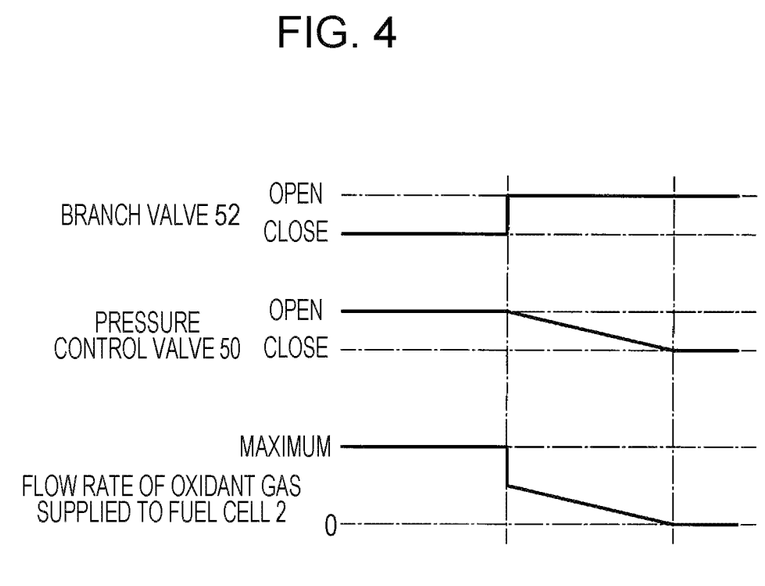
FIG. 4 is a schematic diagram illustrating a relationship between opening/closing of a branch valve and a pressure regulating valve, and flow rate of oxidant gas of the fuel cell system according to the first embodiment.

FIG. 4 is a schematic diagram illustrating a relationship between opening/closing of the branch valve 52 and the pressure regulating valve 50, and flow rate of oxidant gas of the fuel cell system 1 according to the first embodiment.

In the extremely low power generation mode control S13 of FIG. 3, the control device 6 fully opens the branch valve 52 and controls the turbo pump 10 and the pressure regulating valve 50, thereby regulating the flow rate of oxidant gas supplied to the fuel cell 2.

In the extremely low power generation mode control S13, for instance when flow rate Qn of oxidant gas that is requested to the fuel cell 2 is less than or equal to a predetermined value Qr (0<Qn≤Qr), the branch valve 52 is set in a fully open state, the rotational speed of the turbo pump 10 is controlled to be a minimum rotational speed (for instance, 20,000 rpm), and the opening of the pressure regulating valve 50 is regulated, thereby regulating the flow rate of the oxidant gas to be supplied to the fuel cell 2. At this point, as illustrated in FIG. 4, the flow rate of the oxidant gas to be supplied to the fuel cell 2 changes according to the opening of the pressure regulating valve 50.

Also, in the extremely low power generation mode control S13, for instance when the flow rate Qn of oxidant gas that is requested to the fuel cell 2 is greater than the predetermined value Qr and less than the minimum flow rate Qs of oxidant gas (Qr<Qn<Qs), the branch valve 52 is set in a fully open state and the rotational speed of the turbo pump 10 is controlled, thereby regulating the flow rate of the oxidant gas to be supplied to the fuel cell 2. Note that the opening of the pressure regulating valve 50 is regulated arbitrarily. In this manner, in the extremely low power generation mode control S13, the fuel cell 2 is protected from dry-up state by regulating the flow rate of the oxidant gas in the fuel cell 2 all the time according to a requested amount of power generation of the fuel cell system 1. So far, the extremely low power generation mode control S13 has been completed and the flow of the operation method of the fuel cell system 1 in the present embodiment has been completed.

As illustrated in FIG. 3, when determination of "NO" is made in the requested power generation current determination step S11, normal operation is performed with the branch valve 52 in a fully closed state (S15). At this point, the fuel cell 2 generates the requested power generation current Ib which is requested to the fuel cell system 1. Note that in normal operation, the opening of the pressure regulating valve 50 is regulated arbitrarily. So far, the flow of the operation method of the fuel cell system 1 in the present embodiment has been completed.

(Effect of First Embodiment)

According to the first embodiment, the control device 6 controls the turbo pump 10, the branch valve 52, and the pressure regulating valve 50, and regulates the flow rate of the oxidant gas to be supplied to the fuel cell 2 in the extremely low power generation mode. Thus, the control device 6 controls and opens the branch valve 52 to allow oxidant gas to flow through the branch passage 48, thereby making it possible to protect the fuel cell 2 from excessive inflow of oxidant gas thereto. Therefore, in the fuel cell system 1 adopting the turbo pump 10, the fuel cell 2 is protectable from dry-up state.

In addition, the fuel cell 2 is caused to generate an extremely low generation power by setting the rotational speed of the turbo pump 10 to a minimum rotational speed and controlling the branch valve 52, and thus it is possible to protect the fuel cell 2 from excessive inflow of oxidant gas thereto. Therefore, in the fuel cell system 1 adopting the turbo pump 10, the fuel cell 2 is protectable from dry-up state.

Also, the branch valve 52 and the pressure regulating valve 50 are controlled to regulate the flow rate of the oxidant gas to be supplied to the fuel cell 2, and thus the flow rate of the oxidant gas to be supplied to the fuel cell 2 may be regulated more accurately compared with the case where only the branch valve 52 is controlled. Therefore, in the fuel cell system 1 adopting the turbo pump 10, the fuel cell 2 is reliably protectable from dry-up state.

In addition, the pressure regulating valve 50 is disposed upstream in the flow direction of the oxidant off-gas from the connection portion of the oxidant off-gas discharge passage 46 and the branch passage 48, and thus even when the opening of the pressure regulating valve 50 is narrowed, flow of the oxidant gas through the branch passage 48 is able to restrict the increase in the pressure of the cathode-side passage 4 including the oxidant gas supply passage 42 and the oxidant off-gas discharge passage 46. Therefore, it is possible to protect the turbo pump 10 from what is called a surge state and stable driving is achieved.

(Second Embodiment)

Next, a second embodiment will be described.

Figure 5:
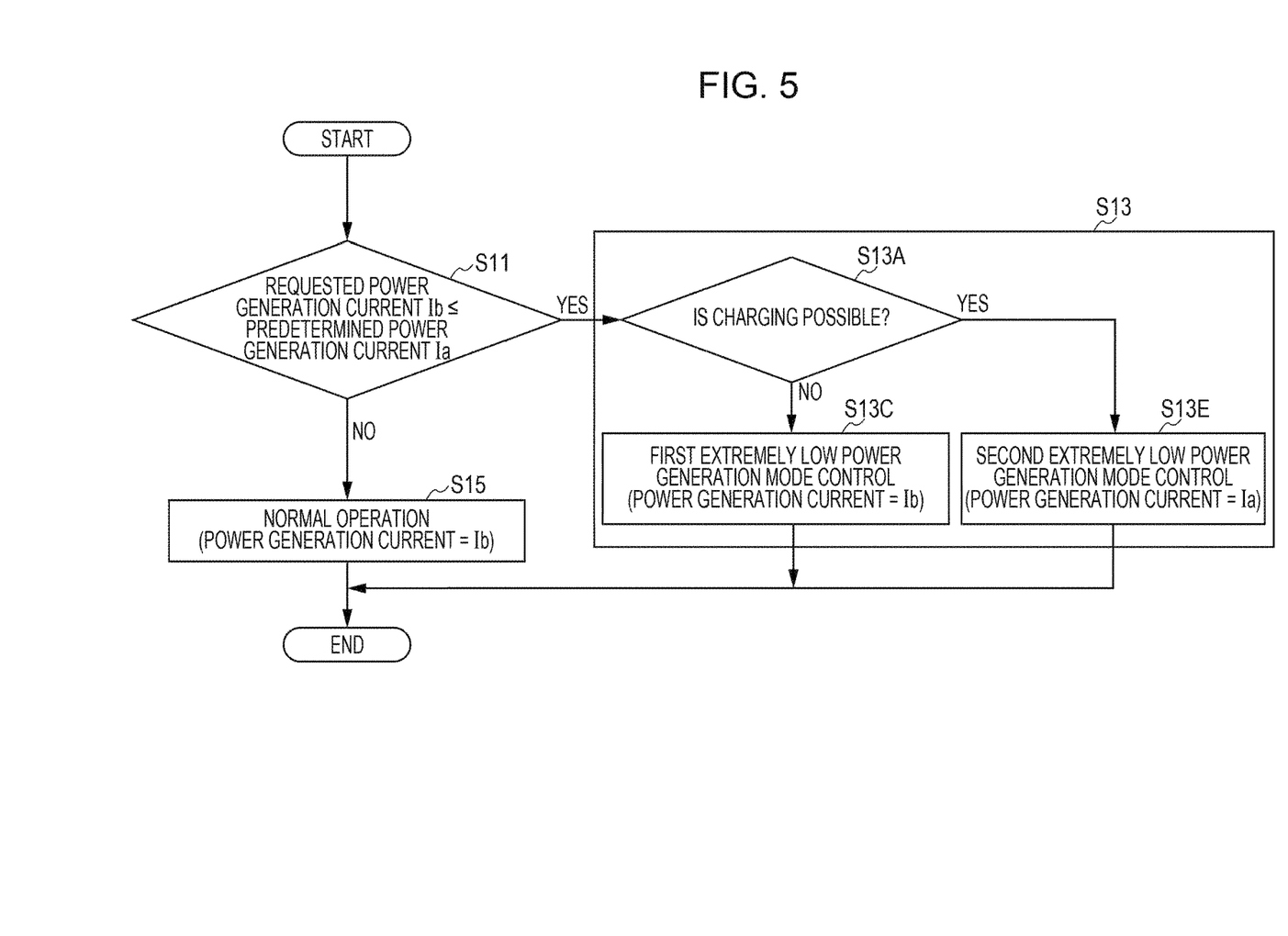
FIG. 5 is a flow chart of an operation method of a fuel cell system according to a second embodiment.

FIG. 5 is a flow chart of an operation method of the fuel cell system 1 according to a second embodiment.

In the operation method of the fuel cell system 1 according to the first embodiment described above, the extremely low power generation mode control S13 is performed without charging the high voltage battery 11 (see FIG. 3). In contrast to this, as illustrated in FIG. 5, the operation method of the fuel cell system 1 according to the second embodiment differs from the operation method of the first embodiment in that the control device 6 performs the extremely low power generation mode control S13 by charging the high voltage battery 11 in addition to control of the turbo pump 10, the branch valve 52, and the pressure regulating valve 50. Note that detailed description of the same configuration as in the first embodiment is omitted in the following.

When determination of "YES" is made in the requested power generation current determination step S11, the extremely low power generation mode control S13 is performed.

In the extremely low power generation mode control S13, first, charge possibility determination step S13A is performed. In the charge possibility determination step S13A, the control device 6 detects the capacity of the high voltage battery 11 by the battery capacity detection unit 12 and determines whether or not the high voltage battery 11 is rechargeable.

When determination of "NO" is made in the charge possibility determination step S13A, a first extremely low power generation mode control S13C is performed. In the first extremely low power generation mode control S13C, the control device 6 controls the turbo pump 10, the branch valve 52, and the pressure regulating valve 50, thereby regulating the flow rate of the oxidant gas to be supplied to the fuel cell 2. The first extremely low power generation mode control S13C is the same as the extremely low power generation mode control S13 (see FIG. 3) in the first embodiment, and thus detailed description is omitted.

On the other hand, when determination of "YES" is made in the charge possibility determination step S13A, the high voltage battery 11 is rechargeable and thus a second extremely low power generation mode control S13E is performed. In the second extremely, low power generation mode control S13E, the control device 6 closes the branch passage 48, for instance, by the branch valve 52, and controls the rotational speed of the turbo pump 10 and the opening of the pressure regulating valve 50, thereby regulating the flow rate of the oxidant gas to be supplied to the fuel cell 2. At this point, oxidant gas needed to generate the predetermined power generation current Ia is supplied to the fuel cell 2. In addition, the control device 6 causes the predetermined power generation current Ia to occur in the fuel cell 2 and charges power to the high voltage battery 11 as surplus power, the power corresponding to the difference between the predetermined power generation current Ia and a requested extremely low power generation current (that is, the request power generation current Ib). In this manner, the fuel cell system 1 is capable of generating the requested power generation current Ib as the entire fuel cell system 1 while charging surplus power generated by the fuel cell 2 to the high voltage battery 11. So far, the extremely low power generation mode control S13 has been completed and the flow of the operation method of the fuel cell system 1 in the present embodiment has been completed.

(Effect of Second Embodiment)

According to the second embodiment, by setting the rotational speed of the turbo pump 10 to a minimum rotational speed and controlling the branch valve 52, the branch passage 48 is closed and the predetermined power generation current Ia is caused to occur in the fuel cell 2 and part of the predetermined power generation current Ia (that is, surplus power) is charged to the high voltage battery 11. Consequently, it is possible to set the electrolyte membrane 2c of the fuel cell 2 in a wet state by produced water. Therefore, in the fuel cell system 1 adopting the turbo pump 10, the fuel cell 2 is protectable from dry-up state.

Also, the fuel cell system 1 includes the battery capacity detection unit 12 and the control device 6 regulates the flow rate of the oxidant gas to be supplied to the fuel cell 2 according to the amount of charge, and thus surplus power is properly rechargeable to the high voltage battery 11. Therefore, in the fuel cell system 1 adopting the turbo pump 10, the fuel cell 2 is reliably protectable from dry-up state.

(Third Embodiment)

Next a third embodiment will be described.

Figure 6:
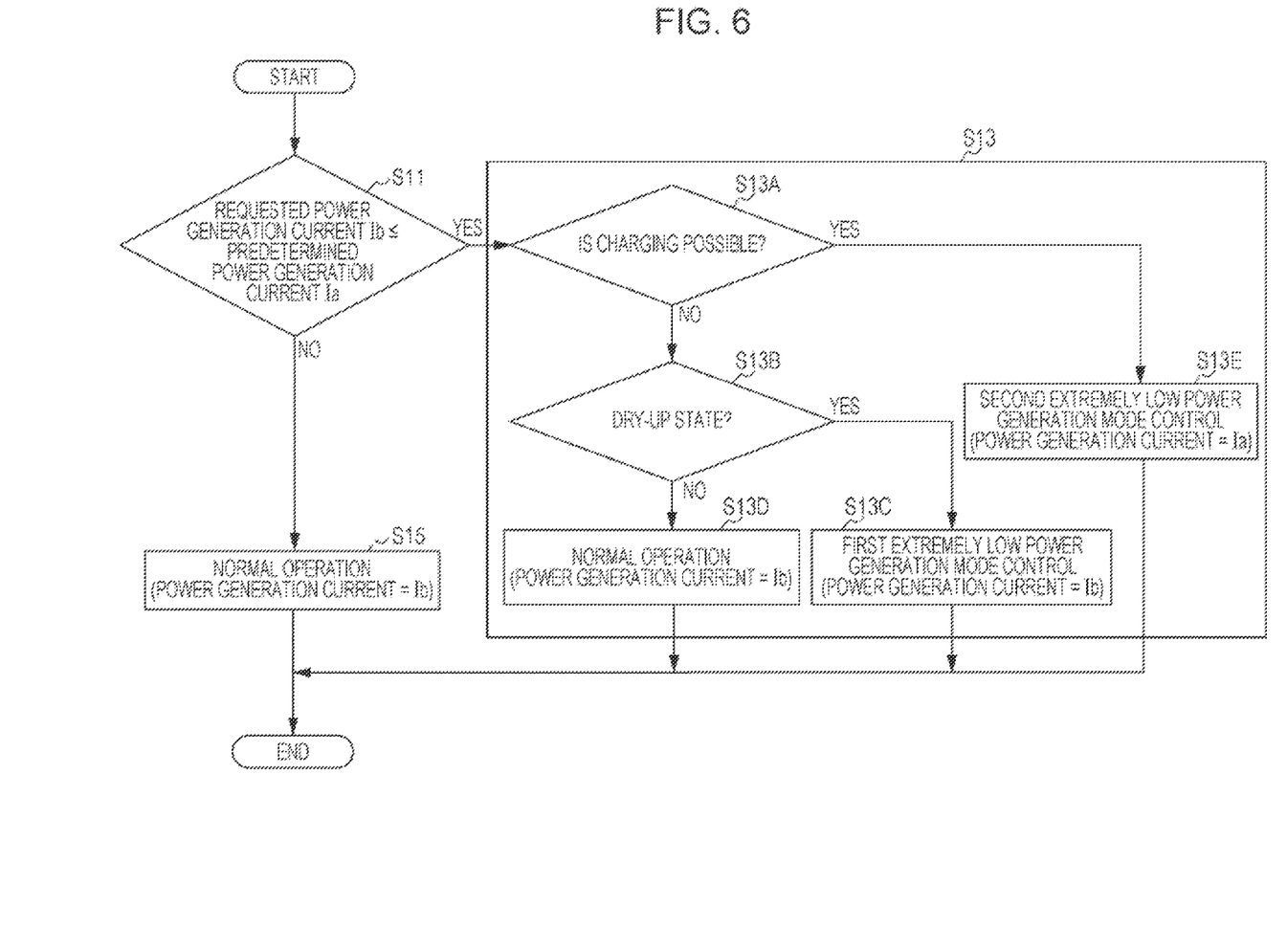
FIG. 6 is a flow chart of an operation method of a fuel cell system according to a third embodiment.

FIG. 6 is a flow chart of an operation method of the fuel cell system 1 according to a third embodiment.

In the operation method of the fuel cell system 1 according to each of the above-described embodiments, the extremely low power generation mode control S13 is performed without detecting whether or not the fuel cell 2 is in dry-up state (see FIG. 3 and FIG. 5).

On the other hand, as illustrated in FIG. 6, the operation method of the fuel cell system 1 according to the third embodiment differs from the above embodiments in that it is detected whether or not the fuel cell 2 is in dry-up state in the extremely low power generation mode control S13. Note that detailed description of the same configuration as in the first and second embodiments is omitted in the following.

When determination of "YES" is made in the requested power generation current determination step S11, the extremely low power generation mode control S13 is performed. In the extremely low power generation mode control S13, first, charge possibility determination step S13A is performed.

When determination of "NO" is made in the charge possibility determination step S13A, dry-up state determination step S13B is performed. In the dry-up state determination step S13B, the control device 6 detects the impedance of the electrolyte membrane $2c$ in the fuel cell 2 by the dry state detection unit 15. The control device 6 determines that the fuel cell 2 is in dry-up state when the impedance of the electrolyte membrane $2c$ is greater than or equal to a predetermined value.

When determination of "YES" is made in the dry-up state determination step S13B, the fuel cell 2 is in dry-up state and the first extremely low power generation mode control S13C is performed. In the first extremely low power generation mode control S13C, the control device 6 controls the turbo pump 10, the branch valve 52, and the pressure regulating valve 50, thereby regulating the flow rate of the oxidant gas to be supplied to the fuel cell 2. The first extremely low power generation mode control S13C in the present embodiment is the same as the extremely low power generation mode control S13 (see FIG. 3) in the first embodiment as well as the extremely low power generation mode control S13C (see FIG. 5) in the first embodiment, and thus detailed description is omitted. At this point, the fuel cell 2 generates a requested power generation current Ib requested to the fuel cell system 1. So far, the extremely low power generation mode control S13 has been completed and the flow of the operation method of the fuel cell system 1 in the present embodiment has been completed.

Also, when determination of "NO" is made in the dry-up state determination step S13B, the fuel cell 2 is not in dry-up state and normal operation is performed (S13D). Normal operation S13D in the present embodiment is the same as the normal operation S15 (see FIG. 3 and FIG. 5) in the first and second embodiments, and thus detailed description is omitted. At this point, the fuel cell 2 generates a requested power generation current Ib requested to the fuel cell system 1.

So far, the extremely low power generation mode control S13 has been completed and the flow of the operation method of the fuel cell system 1 in the present embodiment has been completed. Note that requested power generation current Ib in the normal operation S13D is less than or equal to a predetermined power generation current Ia corresponding to the minimum flow rate Qs of oxidant gas. Therefore, for instance when the minimum flow rate Qs of oxidant gas is continued to be supplied while the rotational speed of the turbo pump 10 is being controlled at a minimum rotational speed (for instance, 20,000 rpm) in the normal operation S13D, excessive oxidant gas may flow into the fuel cell 2 which may assume dry-up state. Thus, after the extremely low power generation mode control S13 is completed, flow of the above-described operation method is repeated, and thus the fuel cell 2 is reliably protected from dry-up state.

On the other hand, when determination of "YES" is made in the charge possibility determination step S13A, the high voltage battery 11 is rechargeable and thus the second extremely low power generation mode control S13E is performed. The second extremely low power generation mode control S13E is the same as in the second embodiment, and thus detailed description is omitted. The fuel cell system 1 generates the requested power generation current Ib as the entire fuel cell system 1 while charging surplus power generated by the fuel cell 2 to the high voltage battery 11. So far, the extremely low power generation mode control S13 has been completed and the flow of the operation method of the fuel cell system 1 in the present embodiment has been completed.

(Effect of Third Embodiment)

According to the third embodiment, the fuel cell system 1 includes the dry state detection unit 15, and the control device 6 regulates the flow rate of the oxidant gas to be supplied to the fuel cell 2 according to dry state of the fuel cell 2, and thus the fuel cell 2 is reliably protectable from dry-up state.

It is to be noted that the present disclosure is not limited to the embodiments described above but includes various modifications of the embodiments without departing from the spirit of the present disclosure.

Although the fuel cell system 1 according to each of the embodiments adopts the high voltage battery 11 as the power storage unit, without being limited to this, the fuel cell system 1 may adopt, for instance, a capacitor.

In each embodiment, the case has been described as an example where the fuel cell system 1 is mounted on a fuel cell vehicle. However, application of control method of the fuel cell system 1 of the present disclosure is not limited to the case where the fuel cell system 1 is mounted on a fuel cell vehicle.

In the fuel cell system 1 according to each embodiment, the pressure regulating valve 50 is located between the humidifier 44 and the branch passage 48 in the oxidant off-gas discharge passage 46 and is disposed upstream in the flow direction of the oxidant off-gas from the connection portion of the oxidant off-gas discharge passage 46 and the branch passage 48. However, the pressure regulating valve 50 may be disposed downstream in the flow direction of the oxidant off-gas from the connection portion of the oxidant off-gas discharge passage 46 and the branch passage 48.

The fuel cell system 1 according to each embodiment includes the branch valve 52 in order to allow oxidant gas to flow through the branch passage 48. However, the fuel cell system 1 may include what is called an injector. In this case, the fuel cell 2 is protectable from excessive inflow of oxidant gas thereto by controlling an designated opening time (Ti value) of the injector and regulating the flow rate of the oxidant gas through the branch passage 48. Therefore, the fuel cell 2 is protectable from dry-up state.

The fuel cell system 1 according to each embodiment protects the fuel cell 2 from excessive inflow of oxidant gas thereto in extremely low power generation mode by regulating the flow rate of the oxidant gas through the branch passage 48 by controlling the pressure regulating valve 50 and the branch valve 52. In contrast to this, the fuel cell 2 may be protected from excessive inflow of oxidant gas thereto by regulating the flow rate of the oxidant gas through the branch passage 48 by controlling at least one of the pressure regulating valve 50 and the branch valve 52.

The fuel cell system 1 according to the third embodiment detects dryness of the fuel cell 2 by measuring the impedance of the fuel cell 2 with the dry state detection unit 15. However, a method of detecting dry state of the fuel cell 2 is not limited to this. For instance, dryness of the fuel cell 2 may be detected based on pieces of information or a combination of pieces of information such as a heated state of the fuel cell 2, a running history of the fuel cell vehicle, an amount of power generation of the fuel cell 2, and the voltage of the fuel cell 2.

Figure 7:
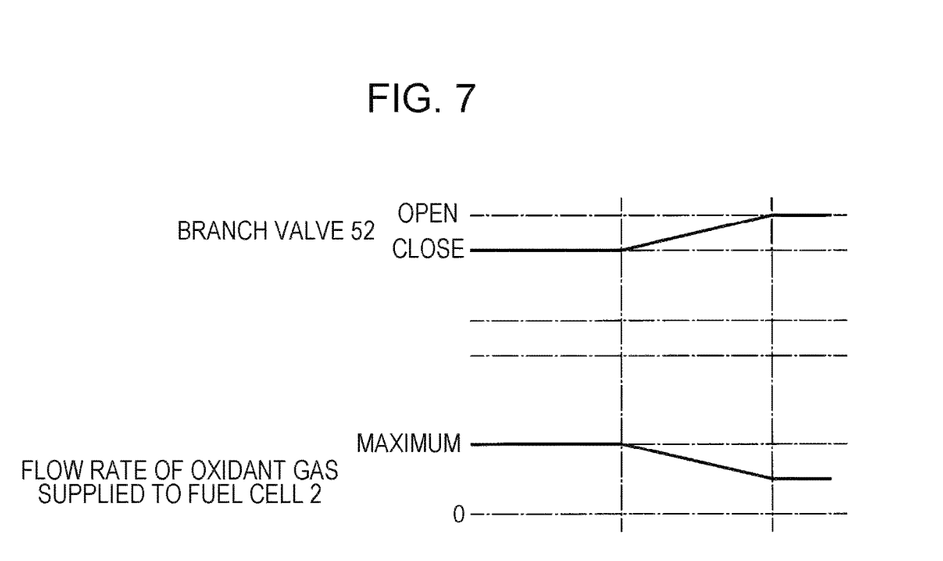
FIG. 7 is a schematic diagram illustrating a relationship between opening/closing of a branch valve and flow rate of oxidant gas of a fuel cell system according to another embodiment.

FIG. 7 is a schematic diagram illustrating a relationship between opening/closing of the branch valve 52 and flow rate of oxidant gas of the fuel cell system 1 according to another embodiment.

The fuel cell system 1 according to each of the above-described embodiments includes the pressure regulating valve 50 between the humidifier 44 and the branch passage 48 in the oxidant off-gas discharge passage 46. In contrast to this, the fuel cell system 1 does not have to include the pressure regulating valve 50. Note that when the pressure regulating valve 50 is not included, the branch valve 52 is a variable valve that may have desired controllable opening.

In the extremely low power generation mode control S13, the control device 6 regulates the opening of the branch valve 52 and controls the turbo pump 10, thereby regulating the flow rate of the oxidant gas to be supplied to the fuel cell 2. For instance, as illustrated in FIG. 7, the flow rate of oxidant gas through the branch passage 48 is increased by enlarging the opening of the branch valve 52 and the amount of the oxidant gas supplied to the fuel cell 2 is decreased. Therefore, the fuel cell system 1 according to another embodiment is capable of protecting the fuel cell 2 from excessive inflow of oxidant gas thereto, and thus the fuel cell 2 is protectable from dry-up state.

Also, the fuel cell system 1 according to an embodiment and the fuel cell system 1 according to another embodiment illustrated in FIG. 7 may be combined and both the pressure regulating valve 50 and the branch valve 52 may be variable valves. In the extremely low power generation mode control S13, for instance when flow rate Qn of oxidant gas that is requested to the fuel cell 2 is less than or equal to a predetermined value Qr (Qn≤Qr), the branch valve 52 is set in a fully open state, the rotational speed of the turbo pump 10 is controlled to be a minimum rotational speed (for instance, 20,000 rpm), thereby regulating the flow rate of the oxidant gas to be supplied to the fuel cell 2. Also, in the extremely low power generation mode control S13, for instance when the flow rate Qn of oxidant gas that is requested to the fuel cell 2 is greater than the predetermined value Qr and less than the minimum flow rate Qs of oxidant gas (Qr<Qn<Qs), the opening of the branch valve 52 is regulated and the rotational speed of the turbo pump 10 is controlled, thereby regulating the flow rate of the oxidant gas to be supplied to the fuel cell 2. Note that at this point, the opening of the pressure regulating valve 50 is regulated arbitrarily.

In addition, a component in the embodiments described above may be replaced by a well-known component as appropriately.

A first aspect of the present disclosure provides an operation method of a fuel cell system (for instance, fuel cell system 1 in the below-described embodiment) that includes: a fuel cell (for instance, fuel cell 2 in the below-described embodiment) that generates power due to a reaction between a fuel gas and an oxidant gas; a turbo pump (for instance, turbo pump 10 in the below-described embodiment) that supplies the oxidant gas to the fuel cell; an oxidant gas supply passage (for instance, oxidant gas supply passage 42 in the below-described embodiment) through which the oxidant gas supplied to the fuel cell by the turbo pump flows through; an oxidant off-gas discharge passage (for instance, oxidant off-gas discharge passage 46 in the below-described embodiment) through which an oxidant off-gas discharged from the fuel cell flows through; a branch passage (for instance, branch passage 48 in the below-described embodiment) that connects the oxidant gas supply passage and the oxidant off-gas discharge passage; a branch valve (for instance, branch valve 52 in the below-described embodiment) that allows a flow rate of the oxidant gas to be regulated, the oxidant gas flowing through the branch passage; and a control unit (for instance, control device 6 in the below-described embodiment) that controls generation power of the fuel cell, the operation method including: controlling the turbo pump and the branch valve, thereby regulating a flow rate of the oxidant gas to be supplied to the fuel cell by the control unit in an extremely low power generation mode in which an extremely low generation power is requested, the extremely low generation power being less than or equal to a predetermined generation power (for instance, predetermined power generation current Ia in the below-described embodiment) corresponding to a minimum flow rate of the oxidant gas that may be supplied by the turbo pump.

According to the present disclosure, the control unit the control unit controls the turbo pump and the branch valve, and regulates the flow rate of the oxidant gas to be supplied to the fuel cell in the extremely low power generation mode. Thus, for instance, the control unit controls and opens the branch valve to allow oxidant gas to flow through the branch passage, thereby making it possible to protect the fuel cell from excessive inflow of oxidant gas thereto. When a power storage unit such as a battery and an auxiliary equipment allow power to be stored or consumed, for instance, the branch valve is controlled so as to be closed, the fuel cell is caused to generate a predetermined generation power corresponding to a minimum flow rate of the oxidant gas, and the differential power (that is, surplus power) between the predetermined generation power and a requested extremely low generation power may be stored or consumed. Therefore, in the fuel cell system adopting a turbo pump, the fuel cell is protectable from dry-up state.

A second aspect of the present disclosure provides the operation method of a fuel cell system in which the control unit sets a rotational speed of the turbo pump to a minimum rotational speed and controls the branch valve, thereby causing the fuel cell to generate the extremely low generation power.

According to the present disclosure, the fuel cell 2 is caused to generate an extremely low generation power by setting the rotational speed of the turbo pump to a minimum rotational speed and controlling the branch valve, and thus it is possible to protect the fuel cell from excessive inflow of oxidant gas thereto. Therefore, in the fuel cell system adopting a turbo pump, the fuel cell is protectable from dry-up state.

A third aspect of the present disclosure provides the operation method of a fuel cell system in which the fuel cell system includes a power storage unit (for instance, high voltage battery 11 in the below-described embodiment) that stores power generated by the fuel cell, and when the power storage unit allows power to be stored in the extremely low power generation mode, the control unit sets a rotational speed of the turbo pump to a minimum rotational speed and closes the branch passage by the branch valve, thereby causing the fuel cell to generate the predetermined generation power and causing part of the predetermined generation power to be stored in the power storage unit.

According to the present disclosure, the fuel cell 2 is caused to generate a predetermined generation power and part (that is, surplus power) of the predetermined generation power is charged to the power storage unit, and thus it is possible to set the electrolyte membrane of the fuel cell in a wet state by produced water. Therefore, in the fuel cell system adopting a turbo pump, the fuel cell is protectable from dry-up state.

A fourth aspect of the present disclosure provides the operation method of a fuel cell system in which the fuel cell system includes a stored power amount detection unit (for instance, battery capacity detection unit 12 in the below-described embodiment) that detects an amount of stored power in the power storage unit, and the control unit regulates a flow rate of the oxidant gas to be supplied to the fuel cell, according to the amount of stored power.

According to the present disclosure, the control unit regulates the flow rate of the oxidant gas to be supplied to the fuel cell according to the amount of charge, and thus surplus power is properly rechargeable to the power storage unit. Therefore, in the fuel cell system adopting a turbo pump, the fuel cell is reliably protectable from dry-up state.

A fifth aspect of the present disclosure provides the operation method of a fuel cell system in which the oxidant off-gas discharge passage includes a pressure regulating valve (for instance, pressure regulating valve 50 in the below-described embodiment) that regulates a flow rate of the oxidant off-gas and allows an internal pressure of the fuel cell to be regulated, the pressure regulating valve is disposed upstream in a flow direction of the oxidant off-gas from a connection portion of the oxidant off-gas discharge passage and the branch passage, and the control unit controls at least one of the branch valve and the pressure regulating valve, thereby regulating a flow rate of the oxidant gas to be supplied to the fuel cell.

According to the present disclosure, at least one of the branch valve and the pressure regulating valve is controlled to regulate the flow rate of the oxidant gas to be supplied to the fuel cell, and thus the flow rate of the oxidant gas to be supplied to the fuel cell may be regulated more accurately compared with the case where only the branch valve is controlled. Therefore, in the fuel cell system adopting a turbo pump, the fuel cell is reliably protectable from dry-up state.

In addition, the pressure regulating valve is disposed upstream in the flow direction of the oxidant off-gas from the connection portion of the oxidant off-gas discharge passage and the branch passage, and thus even when the opening of the pressure regulating valve is narrowed, flow of the oxidant gas through the branch passage is able to restrict the increase in the pressure of the oxidant gas supply passage and the oxidant off-gas discharge passage. Therefore, it is possible to protect the turbo pump from what is called a surge state and stable driving is achieved.

A sixth aspect of the present disclosure provides the operation method of a fuel cell system in which the fuel cell system includes a dry state detection unit (for instance, dry state detection unit 15 in the below-described embodiment) that detects a dry state of the fuel cell, and the control unit regulates a flow rate of the oxidant gas to be supplied to the fuel cell, according to the dry state.

According to the present disclosure, the fuel cell system includes the dry state detection unit, and the control unit regulates the flow rate of the oxidant gas to be supplied to the fuel cell, according to a dry state, and thus the fuel cell is reliably protectable from dry-up state.

Obviously, numerous modifications and variations of the present invention are possible in light of the above teachings. It is therefore to be understood that within the scope of the appended claims, the invention may be practiced otherwise than as specifically described herein.

What is claimed is:

1. An operation method of a fuel cell system that includes:
   a fuel cell that generates power due to a reaction between a fuel gas and an oxidant gas;
   a turbo pump that supplies the oxidant gas to the fuel cell;
   an oxidant gas supply passage through which the oxidant gas supplied to the fuel cell by the turbo pump flows;
   an oxidant off-gas discharge passage through which an oxidant off-gas discharged from the fuel cell flows;
   a branch passage that connects the oxidant gas supply passage and the oxidant off-gas discharge passage;
   a branch valve that allows a flow rate of the oxidant gas to be regulated, the oxidant gas flowing through the branch passage;
   a power storage unit that stores power generated by the fuel cell; and
   a control unit that controls generation power of the fuel cell,
   the operation method comprising:
   controlling the turbo pump and the branch valve, thereby regulating a flow rate of the oxidant gas to be supplied to the fuel cell by the control unit in an extremely low power generation mode in which an extremely low generation power is requested, the extremely low generation power being less than or equal to a predetermined generation power corresponding to a minimum flow rate of the oxidant gas that may be supplied by the turbo pump,
   wherein the control unit is configured to set a rotational speed of the turbo pump to a minimum rotational speed and close the branch passage by closing the branch valve based on a determination by the control unit that the power storage unit allows power to be stored in the extremely low power generation mode.

2. The operation method of a fuel cell system according to claim 1,
   wherein when the control unit sets the rotational speed of the turbo pump to the minimum rotational speed and closes the branch passage by closing the branch valve the fuel cell generates the predetermined generation power and part of the predetermined generation power is stored in the power storage unit.

3. The operation method of a fuel cell system according to claim 2,
   wherein the fuel cell system includes a stored power amount detection unit that detects an amount of stored power in the power storage unit, and
   the control unit regulates a flow rate of the oxidant gas to be supplied to the fuel cell, according to the amount of stored power.

4. The operation method of a fuel cell system according to claim 2,
   wherein the oxidant off-gas discharge passage includes a pressure regulating valve that regulates a flow rate of the oxidant off-gas and allows an internal pressure of the fuel cell to be regulated, the pressure regulating valve is disposed upstream in a flow direction of the oxidant off-gas from a connection portion of the oxidant off-gas discharge passage and the branch passage, and the control unit controls at least one of the branch valve and the pressure regulating valve, thereby regulating a flow rate of the oxidant gas to be supplied to the fuel cell.

5. The operation method of a fuel cell system according to claim 1, wherein the fuel cell system includes a dry state detection unit that detects a dry state of the fuel cell, and the control unit regulates a flow rate of the oxidant gas to be supplied to the fuel cell, according to the dry state.

6. An operation method of a fuel cell system, comprising:

providing a turbo pump to supply an oxidant gas to a fuel cell to generate power through a reaction between a fuel gas and the oxidant gas;

providing a branch valve to regulate a flow rate of the oxidant gas which flows through a branch passage that connects an oxidant gas supply passage and an oxidant off-gas discharge passage, the oxidant gas supplied to the fuel cell by the turbo pump flowing through the oxidant gas supply passage, an oxidant off-gas discharged from the fuel cell flowing through the oxidant off-gas discharge passage;

providing a power storage device that stores power generated by the fuel cell;

controlling the turbo pump and the branch valve to regulate a flow rate of the oxidant gas to be supplied to the fuel cell in an extremely low power generation mode in which an extremely low generation power is requested, the extremely low generation power being less than or equal to a predetermined generation power corresponding to a minimum flow rate of the oxidant gas that is supplied by the turbo pump;

setting a rotational speed of the turbo pump to a minimum rotational speed based on a determination that the power storage device allows power to be stored in the power storage device in the extremely low power generation mode; and controlling the branch valve to close the branch passage in the extremely low power generation mode based on a determination that the power storage device allows power to be stored in the power storage device.

7. The operation method according to claim 6, wherein controlling the branch valve to close the branch passage controls the fuel cell to generate the predetermined generation power and controls part of the predetermined generation power to be stored in the power storage device in the case where the power storage device allows the power to be stored in the power storage device in the extremely low power generation mode.

8. The operation method according to claim 7, further comprising:

providing a stored power amount detector to detect an amount of stored power in the power storage device; and regulating a flow rate of the oxidant gas to be supplied to the fuel cell according to the amount of the stored power.

9. The operation method according to claim 7, further comprising:

providing a pressure regulating valve to regulate a flow rate of the oxidant off-gas and to regulate an internal pressure of the fuel cell on the oxidant off-gas discharge passage, upstream in a flow direction of the oxidant off-gas from a connection portion of the oxidant off-gas discharge passage and the branch passage; and controlling at least one of the branch valve and the pressure regulating valve to regulate a flow rate of the oxidant gas to be supplied to the fuel cell.

10. The operation method according to claim 6, further comprising:

providing a dry state detector to detect a dry state of the fuel cell; and regulating a flow rate of the oxidant gas to be supplied to the fuel cell according to the dry state.

11. A fuel cell system comprising:

a fuel cell to generate power through a reaction between a fuel gas and an oxidant gas;

a turbo pump to supply the oxidant gas to the fuel cell;

an oxidant gas supply passage through which the oxidant gas is supplied to the fuel cell by the turbo pump;

an oxidant off-gas discharge passage through which an oxidant off-gas is discharged from the fuel cell;

a branch passage connecting the oxidant gas supply passage and the oxidant off-gas discharge passage;

a branch valve to regulate a flow rate of the oxidant gas flowing through the branch passage;

a power storage unit that stores power generated by the fuel cell; and a controller configured to control the turbo pump and the branch valve to regulate a flow rate of the oxidant gas to be supplied to the fuel cell in an extremely low power generation mode in which an extremely low generation power is requested, the extremely low generation power being less than or equal to a predetermined generation power corresponding to a minimum flow rate of the oxidant gas that is supplied by the turbo pump, wherein the controller is configured to set a rotational speed of the turbo pump to a minimum rotational speed and close the branch passage by the branch valve based on a determination by the controller that the power storage unit allows power to be stored in the extremely low power generation mode.

12. The operation method of a fuel cell system according to claim 1, wherein the fuel cell system includes a dry state detection unit that detects a dry state of the fuel cell, and the control unit is configured to set the rotational speed of the turbo pump to the minimum rotational speed and open the branch passage by the branch valve based on a determination by the control unit that the power storage unit does not allow power to be stored and a determination by the control unit that the dry state detection unit detects the dry state of the fuel cell in the extremely low power generation mode.

13. The operation method of a fuel cell system according to claim 1, wherein the fuel cell system includes a dry state detection unit that detects a dry state of the fuel cell, and the control unit is configured to set the rotational speed of the turbo pump to the minimum rotational speed and close the branch passage by the branch valve based on a determination by the control unit that the power storage unit does not allow power to be stored and a determination by the control unit that the dry state detection unit does not detect the dry state of the fuel cell in the extremely low power generation mode.

14. The operation method of a fuel cell system according to claim 7, further comprising:

providing a dry state detector to detect a dry state of the fuel cell; and setting the rotational speed of the turbo pump to the minimum rotational speed and opening the branch passage by the branch valve based on a determination that the power storage unit does not allow power to be stored and a determination that the dry state detector detects the dry state of the fuel cell in the extremely low power generation mode.

15. The operation method of a fuel cell system according to claim 7, further comprising:

providing a dry state detector to detect a dry state of the fuel cell; and setting the rotational speed of the turbo pump to the minimum rotational speed and closing the branch passage by the branch valve based on a determination that the power storage unit does not allow power to be stored and a determination that the dry state detector does not detect the dry state of the fuel cell in the extremely low power generation mode.

16. The fuel cell system according to claim 11, further comprising:

a dry state detection unit that detects a dry state of the fuel cell, wherein the controller is configured to set the rotational speed of the turbo pump to the minimum rotational speed and open the branch passage by the branch valve based on a determination by the controller that the power storage unit does not allow power to be stored and a determination by the controller that the dry state detection unit detects the dry state of the fuel cell in the extremely low power generation mode.

17. The fuel cell system according to claim 11, further comprising:

a dry state detection unit that detects a dry state of the fuel cell, wherein the controller is configured to set the rotational speed of the turbo pump to the minimum rotational speed and close the branch passage by the branch valve based on a determination by the controller that the power storage unit does not allow power to be stored and a determination by the controller that the dry state detection unit does not detect the dry state of the fuel cell in the extremely low power generation mode.

* * * * *